United States Patent [19]
Julin et al.

[11] Patent Number: 5,557,679
[45] Date of Patent: Sep. 17, 1996

[54] METHOD FOR PERSONALIZATION OF AN ACTIVE CARD

[75] Inventors: Tomas Julin, Stockholm; Björn Almgren, Bromma; Leif Sandberg, Saltsjö-Boo, all of Sweden

[73] Assignee: Comvik GSM AB, Hagersten, Sweden

[21] Appl. No.: 211,375

[22] PCT Filed: Sep. 23, 1992

[86] PCT No.: PCT/SE92/00656

§ 371 Date: Mar. 30, 1994

§ 102(e) Date: Mar. 30, 1994

[87] PCT Pub. No.: WO93/07697

PCT Pub. Date: Apr. 15, 1993

[30] Foreign Application Priority Data

Sep. 30, 1991 [SE] Sweden .................. 9102835

[51] Int. Cl.⁶ .................. H04L 9/00; H04L 9/32
[52] U.S. Cl. .................. 380/23; 380/4; 380/9; 380/25; 380/49; 380/50; 235/380
[58] Field of Search .................. 380/4, 9, 23, 25, 380/49, 50, 29, 24; 235/379, 380

[56] References Cited

U.S. PATENT DOCUMENTS 4,544,833  10/1985  Ugon .................. 235/379
5,012,074   4/1991  Masada .................. 235/379
5,020,105   5/1991  Rosen et al. .................. 380/23
5,060,264  10/1991  Muellner et al. .................. 380/23 X
5,237,612   8/1993  Raith .................. 380/23
5,241,598   8/1993  Raith .................. 380/23 X
5,301,234   4/1994  Mazziotto et al. .................. 380/23
5,309,501   5/1994  Kozik et al. .................. 380/23 X
5,412,726   5/1995  Nevoux et al. .................. 380/23 X

FOREIGN PATENT DOCUMENTS 83063495   12/1985  Sweden .................. G07C 11/00
 2073461    4/1984  United Kingdom .................. G07F 7/10
WO8903143   4/1989  WIPO .................. H04L 9/00
WO9009009   8/1990  WIPO .................. G06K 19/073

Primary Examiner—Bernarr E. Gregory
Attorney, Agent, or Firm—Christie, Parker & Hale, LLP

[57] ABSTRACT

Personalization of an active so-called SIM card for a mobile telephone system of the GSM type is effected in a place connected to the central computer of the system via a communication network. The card identity IMSI and card authentication key Ki are transferred in line-encrypted form to terminal equipment in that place, where the card is inserted in a reader. After line decryption, the result thereof is transferred to the card in a manner to prevent unauthorized listening-in. This can be done in a safety box or by double encryption of IMSI and Ki, the decryption thereof being performed within the card by means of a unique card key Ksim.

13 Claims, 3 Drawing Sheets

METHOD FOR PERSONALIZATION OF AN ACTIVE CARD

TECHNICAL FIELD

The present invention relates to a method for personalization of an active subscriber card, a so-called Subscriber Identity Module (SIM) card, for use in a mobile telephone system, comprising a central computer, the unique identity of the card, so-called International Mobile Subscriber Identification (IMSI), and the unique authentication key of the card, Ki, being stored in the card from the central computer. The invention is especially applicable to a mobile telephone system such as the Global Systems for Mobile Communications (GSM) and will be described in more detail with reference thereto, although it is obvious that the invention is also applicable to other mobile telephone systems of a similar type.

TECHNICAL BACKGROUND

In mobile telephone systems, in which the mobile units are controlled by active cards assigned to the subscribers, the personalization of the respective card constitutes an essential procedure which is safeguarded by rigorous security measures and which includes activating the card and loading it with IMSI and Ki, and preferably also a so-called PUK code (Personal Unblocking Key). It is essential that this loading be effected in a safe manner to prevent unauthorised people from having access thereto.

In view hereof, the personalization procedure is carried out in a central personalization place or a customer service place adjacent the central computer, where it is possible to meet the high demands on security.

OBJECT OF THE INVENTION

The object of the present invention is to provide a method making it possible, still in a safe manner, to effect the personalization procedure in places other than the above-mentioned central place, whereby a number of advantages can be gained.

SUMMARY OF THE INVENTION

The above-mentioned object is achieved by a method which according to the invention has the features stated in the appended claims.

According to the invention, the storage procedure should thus be carried out when the card is in a personalization place remotely connected to the central computer via a data communication network, especially a retail place, the card being inserted in a reader associated with data terminal equipment connected to the data communication network, IMSI and Ki and preferably also PUK being transferred in line-encrypted form from the central computer to the data terminal equipment where line decryption is performed, and the result of the line decryption being transferred to the SIM card in a manner to prevent unauthorised listening-in.

A distributed personalization of this type makes it possible to divide up IMSI number series geographically, which is a major advantage in that the network signalling is simplified or reduced, and also in that the service level toward a new subscriber can be kept very high. In fact, the personalization can be effected directly and without any waiting time conditioned by the dispatch of cards, code envelopes, etc., from a central place. The direct communication with the central computer also makes it possible to provide for different special services in a rapid and simple manner.

The transfer of the result of the line decryption to the SIM card in a safe manner can be carried out in different ways.

According to a first conceivable alternative, the line decryption and the result transfer to the SIM card take place in a physically sealed space, into which any attempt of unauthorised intrusion means that relevant information is erased and that the process is interrupted and cannot be continued without special security measures being taken. Mechanical and electronic protection of this kind can be achieved by means of a special safety box, in which the circuitry concerned is enclosed during the personalization procedure.

According to a second conceivable alternative, the result of the line decryption is transferred to the SIM card in encrypted form, at least in respect of Ki. This is preferably done by encrypting Ki and preferably also PUK and optionally IMSI an extra time in the central computer before the line-encrypted transfer to the personalization place, the result of the line decryption transferred to the SIM card being decrypted within the SIM card by means of a card key Ksim, which has suitably been stored in the SIM card in connection with the manufacture thereof. This card key Ksim is preferably unique to the respective card.

The decryption in the SIM card here takes place advantageously by means of the card key and a secret algorithm, especially being the algorithm which is intended for encryption/decryption in connection with the regular use of the card in the mobile telephone system, and on which there is information in the central computer. Advantageously, the algorithm is of type A3/A8 according to the GSM recommendation.

According to the invention, it is preferred that the central computer, before the double encryption, calculates the required Ksim, using SIM-card identification transferred from the personalization place, the "master key" by means of which the SIM card is manufactured and the pertaining algorithm.

It is understood that the central computer may have been separately supplied with information on both said master key and the algorithm concerned for new SIM cards after the manufacture thereof with the card manufacturer.

It is, however, also possible that the above-mentioned SIM-card identification transferred to the central computer may contain such information that the central computer can conclude on the basis thereof which master key (among a number of possible ones) and which algorithm (among a number of possible ones) are at issue.

This obviously means that the key Ksim, for enhanced security, can be modified during the continuous manufacture of the SIM cards.

The above-mentioned SIM-card identification may consist of the serial number of the card, which then can include special fields with information on, e.g., the master key and/or the algorithm concerned.

It is understood that, for further enhanced security, it is possible to combine the two alternatives described above.

According to the invenion, it is further advantageous to control the personalization procedure by means of an active personalization card which is inserted in a reader associated with the data terminal equipment and which contains at least parts of the line-encryption function, especially a pertaining key, preferably also the pertaining algorithm.

Anyone who handles the personalization procedure (e.g., a retailer) can thus have his own unique active card, which can thus be used both for authorisation checks (active and passive authentication), and as an encrypting unit. Everyone can then have an individual encryption key for further enhanced security.

Further features of the invention will appear from the following description of exemplifying embodiments with reference to the accompanying drawings.

DESCRIPTION OF EMBODIMENTS

Figure 1:
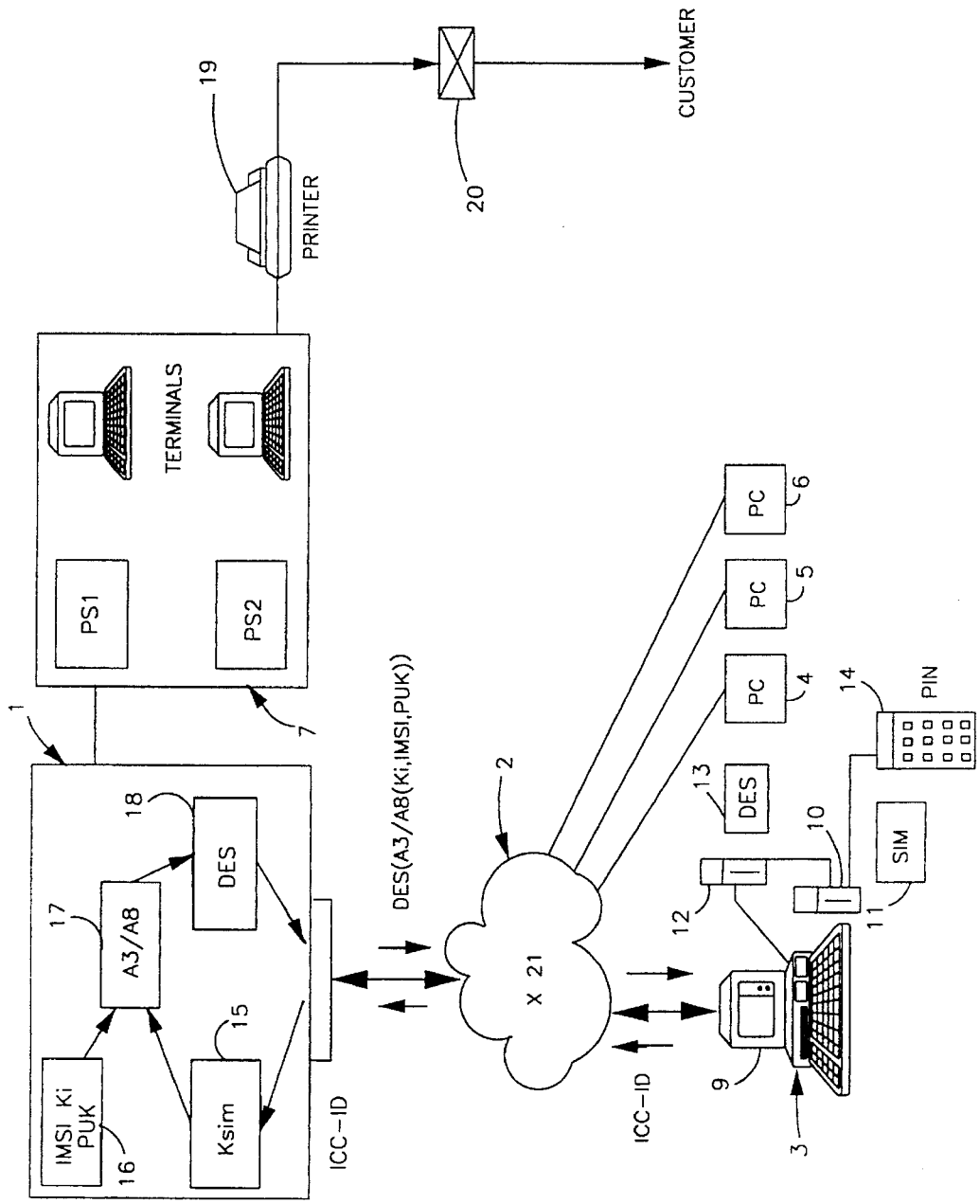
FIG. 1 is a diagrammatical general view illustrating an embodiment of the method according to the invention.

In FIG. 1, reference number 1 designates, in a mobile telephone system, a central computer which via a data communication network 2 communicates with a number of retailers 3, 4, 5, and 6, and which also communicates with a customer service place 7.

Each retailer has data terminal equipment 9, to which are connected a reader 10 for SIM cards 11 and line-encryption equipment 12, 13 consisting of a reader 12 and an active retailer card 13. A keyboard 14 for entering a PIN code in a SIM card concerned is connected to the reader 10.

The central computer 1 contains means 15 for calculating Ksim on the basis of card information ICC-ID transferred from the retailer place, means 16 for generating IMSI, Ki and PUK, means 17 for encrypting the latter ones, using the key Ksim and an A3/A8 algorithm, and means 18 for DES line encryption (Data Encryption Standard).

The central computer provides information about PUK to the customer service place 7, which on a printer 19 prints out a letter 20 with information about this. This letter is sent by post to the customer concerned.

The function according to the invention will now be described in more detail with reference also to FIG. 2.

The systems operator 21 informs the card manufacturer 22 and the central computer 1 about master key, DES and A3/A8 algorithms, and the central computer also about the retailer card key K1. The card manufacturer calculates Ksim for the respective card in a series to be sent to a certain retailer 3 based on the DES algorithm, the master key and the card serial number. Ksim and the A3/A8 algorithm are loaded in the card along with card serial numbers before the card is sent to the retailer.

From the systems operator, the retailer receives his personal active card 13 with the pertaining entered card key K1 and DES algorithm for the line encryption, about which the central computer thus holds information.

When a retailer is to personalize a new SIM card for a new subscriber, he starts by inserting his active card 13 in a reader 12 associated with the retailer terminal and logs in in the customary manner, the active card serving as authentication means (optionally together with a PIN code which is unique to the retailer and which is inputted on the terminal keyboard), thus verifying the authorisation of the retailer.

A new SIM card 11 is now inserted in the pertaining reader 10, card-indentifying information ICC-ID being transferred from certain fields, preprogrammed during the manufacture of the card, in the SIM card via the retailer terminal 9 and the network 2 to the central computer 1. Other relevant subscriber data are inputted via the keyboard of the terminal and transmitted to the central computer for customary checking, etc. If the subscriber is accepted, the number MSISDN selected or accepted by the subscriber is also transmitted to the central computer.

In the central computer, Ksim is calculated on the basis of the information received on master key, serial number and DES algorithm. Ki and PUK are generated as random numbers. IMSI is allocated from the IMSI series prepared for the retailer or the area to which the retailer belongs.

IMSI, Ki and PUK are encrypted using Ksim and the selected A3/A8 algorithm. The thus-encrypted IMSI, Ki and PUK and other data to be transferred are thereafter line encrypted using the key K1 and the DES algorithm, and transferred via the data communication network to the retailer terminal, where line decryption occurs using the card key K1 and DES algorithm of the retailer's active card 13.

Via the reader 10, the other data now decrypted can be loaded directly in the SIM card, while IMSI, Ki and PUK, still in encrypted form, are transferred to the SIM card for decryption therein, using the card key Ksim and the pertaining A3/A8 algorithm. Advantageously, this algorithm is identical with the algorithm which is intended for the regular use of the card and which is unique to the systems operator and can be varied for different card series, if desired.

After decryption, IMSI, Ki and PUK are loaded in the pertaining data field in The SIM card.

Via the PIN keyboard 13, the subscriber can himself load an optional PIN code in the SIM card in a strictly confidential manner. The card is thus ready for use. The PUK code assigned by the central computer is sent to the subscriber by post after a day or two.

Figure 2:
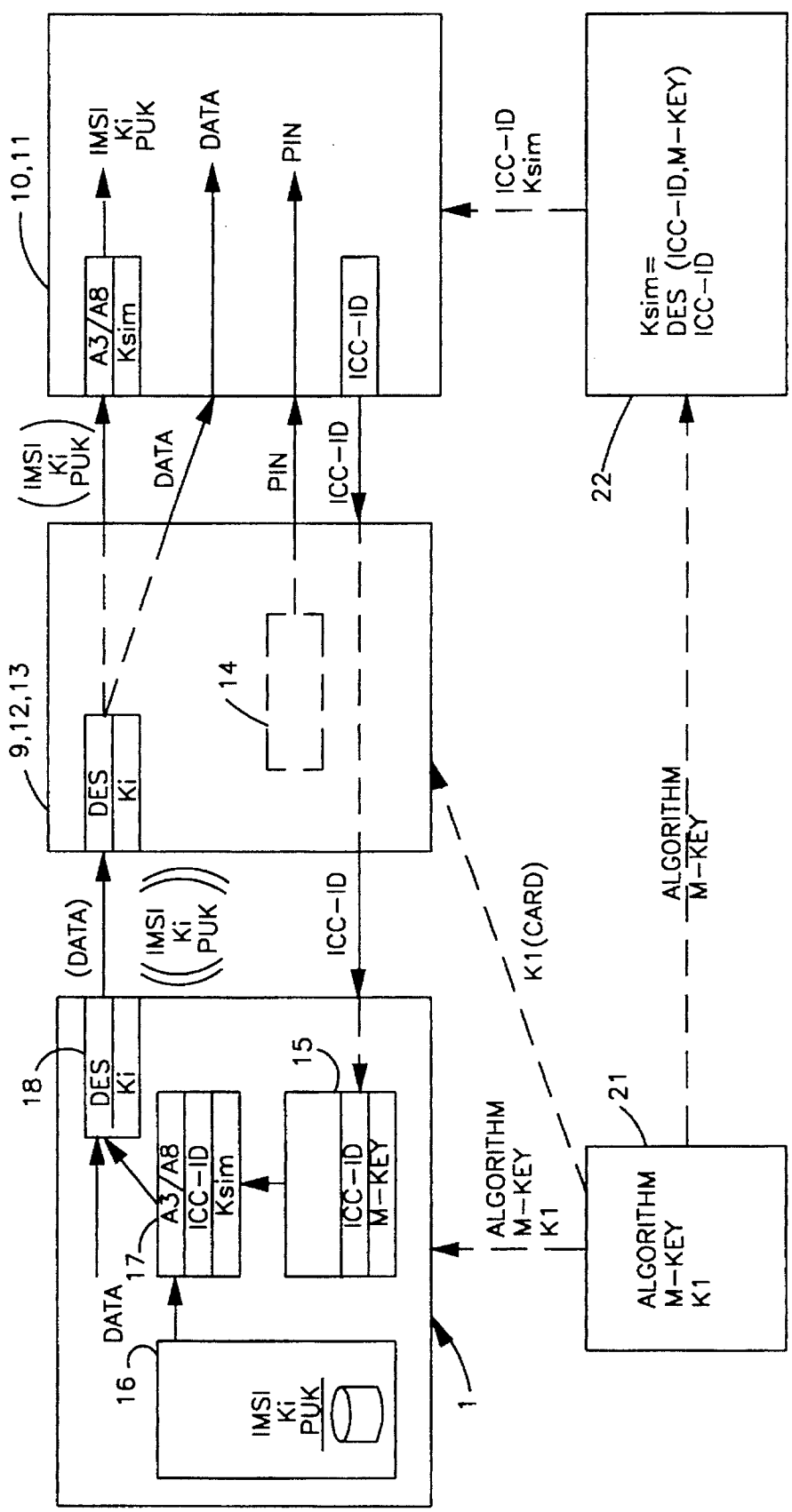
FIG. 2 is a block diagram which illustrates in more detail the embodiment of FIG. 1.
Figure 3:
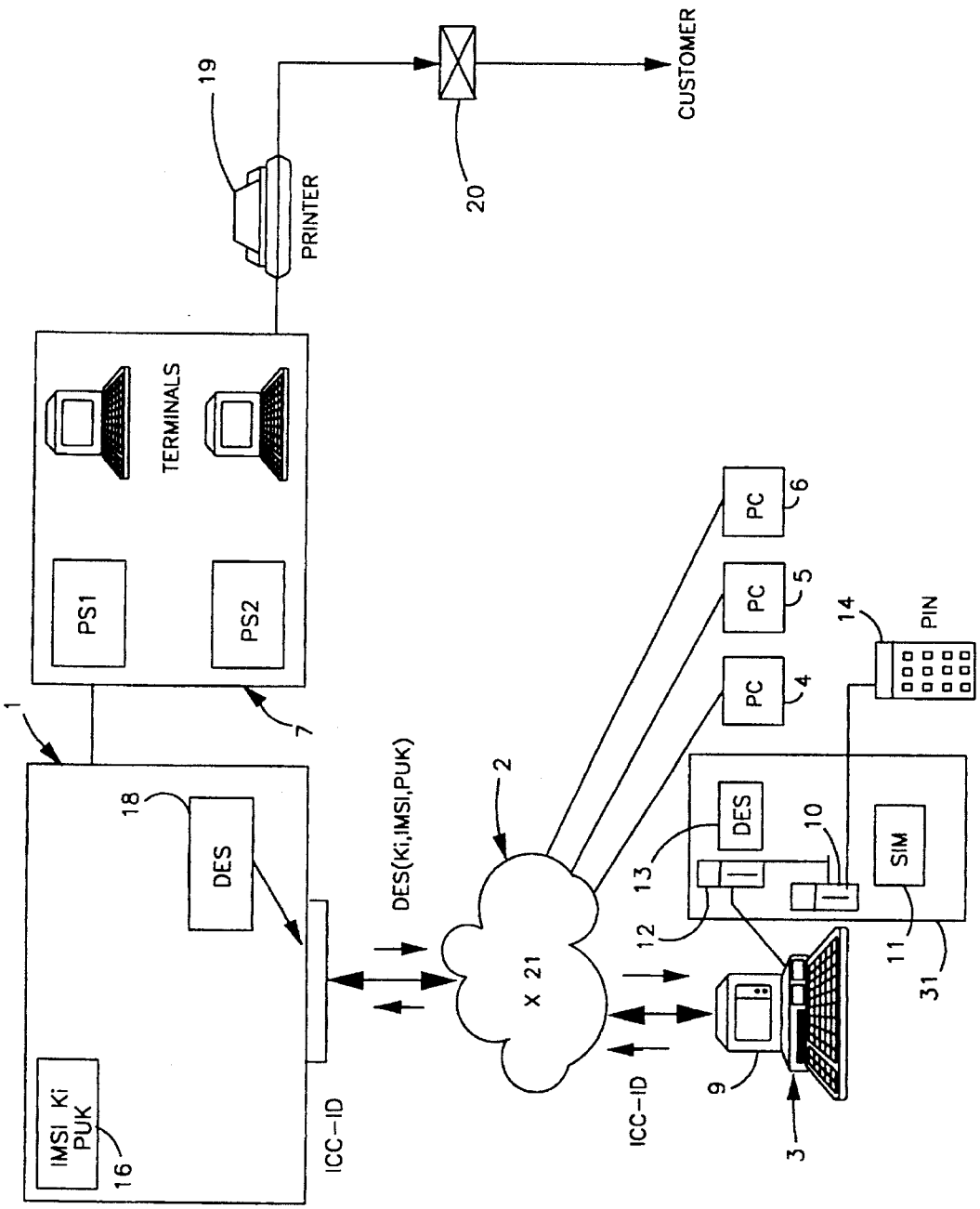
FIG. 3 is a block diagram illustrating another embodiment of the method according to the invention.

The alternative embodiment of the invention shown in FIG. 3 differs from that in FIGS. 1 and 2 by the absence of the double encryption procedure. The transfer of Ki, IMSI and PUK to the SIM card 11 after line decryption, which occurs by means of the retailer card 13 inserted in its reader 12, instead occurs in a protected manner, by the card reader 12 with its card 13 and the SIM card 11 in its reader 10 (connected to the reader 12) being mechanically and electronically protectively enclosed in a safety box 31 during the personalization procedure.

As readily appreciated by those skilled in the art, the safety box 31 may be designed in many different ways, which also applies to the means which should be provided for interrupting the procedure and erasing sensitive data in the case of an attempted intrusion into the safety box.

It is understood that the two alternatives described above can be combined, if additional security is desired in the retailer place and/or during the transfer via the data communication network.

We claim:

1. A method for programming an active card from a remote central computer for use in a mobile telephone system comprising the steps of:

inserting the active card in a card reader associated with a data terminal;

encrypting data representative of a unique identity code and a unique authentication key with the remote central computer;

transferring the encrypted data from said remote central computer through a data communication network to the data terminal;

decrypting the encrypted data into card data at the data terminal; and transferring the card data to the active card.

2. The method of claim 1 comprising the step of performing the steps of decrypting the encrypted data into the card data and transferring the card data to the active card in a physically sealed space wherein an unauthorized intrusion results in the erasure of the data.

3. The method according to claim 1 or 2 wherein the step of decrypting the encrypted data is performed so that the card data comprises second encryption data.

4. The method of claim 3 wherein the unique identity code and the unique authentication key are double encrypted in the remote central computer, and further comprising the step of decrypting the second encryption data in the active card by means of a card key.

5. The method of claim 4 wherein the card key for decrypting the second encryption data in the active card is unique to the card.

6. The method of claim 5 further comprising the step of calculating the unique card key by the remote central computer before encryption, said unique card key be calculated from an identification code from said active card, a master key with which the active card is produced and which information has been entered into the remote central computer, and an algorithm.

7. The method of claim 2 wherein the steps of decrypting the encrypted data into the card data and transferring the card data to the active card in a physically sealed space is performed with two readers and a communication path therebetween.

8. The method of claim 1 wherein said active card controls at least a portion of the encryption by the remote central computer.

9. The method of claim 8 wherein the remote central computer performs the step of encryption with a DES algorithm.

10. The method of claim 1 wherein the step of encrypting data with the remote central computer further comprises the step of encrypting a personal unblocking key.

11. The method of claim 1 further comprising the step of storing a pin code in the active card by means of a keyboard associated with said data terminal.

12. The method of claim 1 wherein the mobile telephone system is a GSM type.

13. The method of claim 1 wherein the unique identity code is a ISMI.

* * * * *